United States Patent
Murakami et al.

(10) Patent No.: US 10,103,818 B2
(45) Date of Patent: Oct. 16, 2018

(54) TRANSMITTING DEVICE, QUANTUM COMMUNICATION SYSTEM, AND QUANTUM COMMUNICATION METHOD

(71) Applicant: Kabushiki Kaisha Toshiba, Minato-ku (JP)

(72) Inventors: Akira Murakami, Kawasaki (JP); Yoshimichi Tanizawa, Yokohama (JP); Alex Dixon, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/439,084

(22) Filed: Feb. 22, 2017

(65) Prior Publication Data
US 2018/0083714 A1    Mar. 22, 2018

(30) Foreign Application Priority Data
Sep. 20, 2016    (JP) .................................. 2016-183195

(51) Int. Cl.
*H04B 10/70*    (2013.01)
*H04L 9/08*    (2006.01)

(52) U.S. Cl.
CPC .................................. *H04B 10/70* (2013.01)

(58) Field of Classification Search
CPC ..................................................... H04B 10/70
(Continued)

(56) References Cited

U.S. PATENT DOCUMENTS

2008/0147820 A1* 6/2008 Maeda ................... H04L 9/0858
  709/213
2011/0085666 A1* 4/2011 Hicks ..................... H04L 9/0852
  380/278

(Continued)

FOREIGN PATENT DOCUMENTS

JP    2017-175320 A    9/2017

OTHER PUBLICATIONS

N. Walenta, et al., "A fast and versatile quantum key distribution system with hardware key distillation and wavelength multiplexing", New Journal of Physics 16, 2014, 21 pgs.

*Primary Examiner* — Oommen Jacob
(74) *Attorney, Agent, or Firm* — Oblon, McClelland, Maier & Neustadt, L.L.P.

(57) ABSTRACT

A transmitting device according to an embodiment include a transmission unit, a storage unit, a cache unit, a reception unit, and a sifting processing unit. The transmission unit transmits a transmission photon to a receiving device. The storage unit stores transmission photon information including transmission timing at which the transmission photon is transmitted, a transmission bit indicated by the transmission photon, and a transmission base of the transmission photon. The cache unit stores, one or more pieces of transmission information including the transmission timing after an elapse of a no-use period of the transmission photon. The reception unit receives, from the receiving device, the reception timing and a reception base of the reception photon. The sifting processing unit performs sifting processing on the transmission bit by making a correlation between the transmission base and the reception base on the basis of the reception timing and the transmission timing.

7 Claims, 5 Drawing Sheets

(58) Field of Classification Search
USPC .......................................................... 398/140
See application file for complete search history.

(56) References Cited

U.S. PATENT DOCUMENTS

| | | | |
|---|---|---|---|
| 2012/0177201 A1* | 7/2012 | Ayling | H04B 10/70 |
| | | | 380/278 |
| 2013/0163759 A1* | 6/2013 | Harrison | H04L 9/0852 |
| | | | 380/268 |
| 2014/0059422 A1* | 2/2014 | Devara | G06F 17/2247 |
| | | | 715/234 |
| 2015/0172048 A1* | 6/2015 | Wabnig | H04B 10/70 |
| | | | 380/256 |
| 2015/0193306 A1* | 7/2015 | Doi | G06F 11/1402 |
| | | | 714/746 |
| 2015/0222619 A1* | 8/2015 | Hughes | H04L 63/08 |
| | | | 713/168 |
| 2016/0013937 A1* | 1/2016 | Choi | H04B 10/85 |
| | | | 380/278 |
| 2016/0142203 A1* | 5/2016 | Tanizawa | H04L 9/0852 |
| | | | 380/280 |
| 2017/0279540 A1 | 9/2017 | Tanizawa et al. | |

* cited by examiner

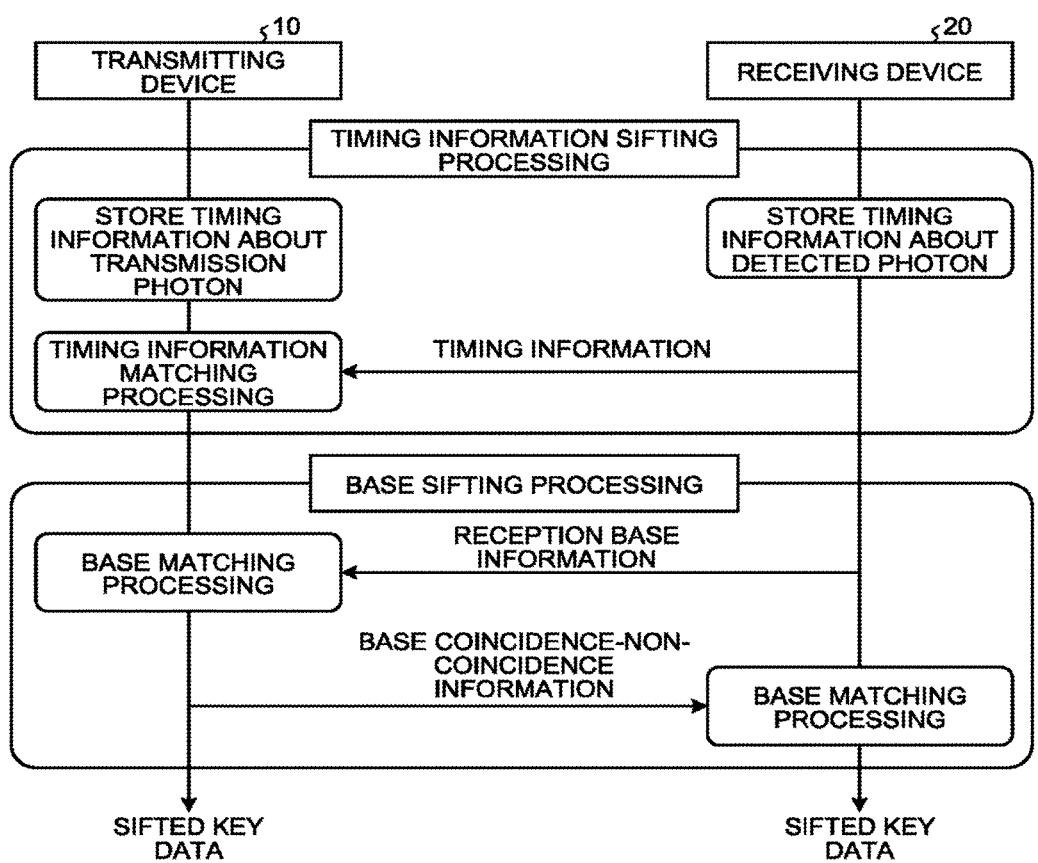

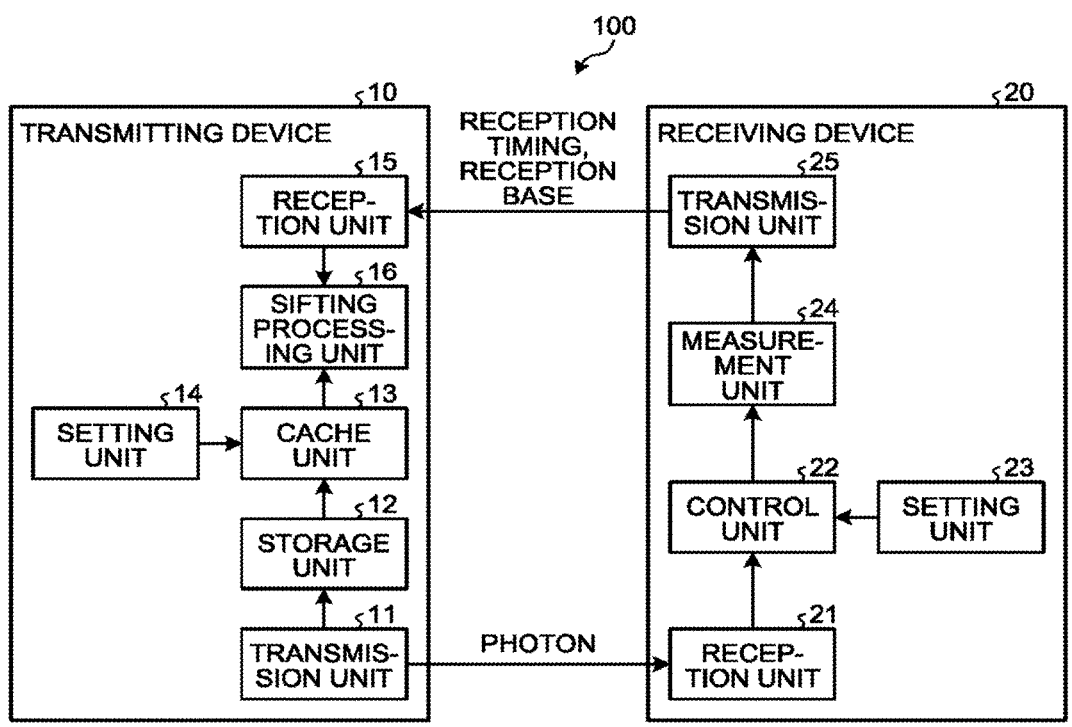

TRANSMITTING DEVICE, QUANTUM COMMUNICATION SYSTEM, AND QUANTUM COMMUNICATION METHOD

CROSS-REFERENCE TO RELATED APPLICATIONS

This application is based upon and claims the benefit of priority from Japanese Patent Application No. 2016-183195, filed on Sep. 20, 2016; the entire contents of which are incorporated herein by reference.

FIELD

Embodiments described herein relate generally to a transmitting device, a quantum communication system, and a quantum communication method.

BACKGROUND

Quantum key distribution (QKD) technology has been known in which an encryption key is shared safely between a transmitting device and a receiving device that are coupled to each other with an optical fiber using a single photon transmitted continuously between the transmitting device and the receiving device. It is guaranteed that the encryption key shared by the quantum key distribution technology is not sniffed on the basis of the principle of quantum mechanics. The shared encryption key is used for encrypted communication such as one-time pad encrypted communication. In the one-time pad encrypted communication, an encryption key having the same size (quantity) as transmitted and received data is used and the used encryption key is destroyed. It is guaranteed that encrypted data transmitted and received by the one-time pad encrypted communication cannot be decrypted by an eavesdropper who has unlimited knowledge on the basis of information theory.

It is, however, difficult for the conventional technology to increase a processing speed of sifting processing performed in quantum key distribution processing.

BRIEF DESCRIPTION OF THE DRAWINGS

FIG. 3 is a schematic diagram illustrating an example of sifting processing in the first embodiment;

FIG. 4 is a schematic diagram illustrating an exemplary functional configuration of the quantum communication system in the first embodiment;

FIG. 5 is a schematic diagram for explaining an example of transmission photon information stored in a cache unit in the first embodiment;

DETAILED DESCRIPTION

A transmitting device according to an embodiment include a transmission unit, a storage unit, a cache unit, a reception unit, and a sifting processing unit. The transmission unit transmits a transmission photon to a receiving device. The storage unit stores transmission photon information in which transmission timing at which the transmission photon is transmitted, a transmission bit indicated by the transmission photon, and a transmission base of the transmission photon are in association with one another. The cache unit stores, one or more pieces of transmission information including the transmission timing after an elapse of a no-use period of the transmission photon from the transmission timing at which the transmission photon is transmitted such that the transmission timing is identical with reception timing at which the transmission photon is detected by the receiving device as a reception photon. The reception unit receives, from the receiving device, the reception timing and a reception base of the reception photon. The sifting processing unit performs sifting processing on the transmission bit by making a correlation between the transmission base and the reception base on the basis of the reception timing and the transmission timing of the transmission photon information stored in the cache unit.

The following describes embodiments of a transmitting device, a quantum communication system, and a quantum communication method in detail with reference to the accompanying drawings.

First Embodiment

The following describes a first embodiment.

Device Configuration of Quantum Communication System

Figure 1:
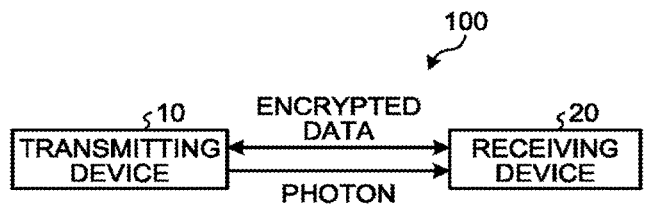
FIG. 1 is a schematic diagram illustrating an exemplary device configuration of a quantum communication system in a first embodiment.

FIG. 1 is a schematic diagram illustrating an exemplary device configuration of a quantum communication system 100 in the first embodiment. The quantum communication system 100 in the first embodiment includes a transmitting device 10 and a receiving device 20. The transmitting device 10 continuously transmits photons (a single photon) to the receiving device 20. In the first embodiment, the device that transmits photons is called the transmitting device 10 for expository convenience. The transmitting device 10 may have a function to receive photons. Likewise, the receiving device 20 may have a function to transmit photons.

The transmitting device 10 and the receiving device 20 share an encryption key by quantum key distribution processing (see FIG. 2), which is described later. The transmitting device 10 and the receiving device 20 transmit and receive encrypted data using the shared encryption key.

The technology that performs the encrypted communication using a safe encryption key shared by quantum key distribution technology is called quantum cryptography technology. A secure key rate, which is a basic performance index of the quantum key distribution, is specified by a length (bit length) of the encryption key capable of being shared per a unit time. The secure key rate is also called a key distribution speed. The quantum key distribution technology capable of sharing a number of encryption keys per a unit time can perform high-speed quantum key distribution. When the high-speed quantum key distribution technology is achieved, the speed of the encrypted communication using the shared encryption key can be increased and its safety can be enhanced. It is, thus, important for the quantum key distribution technology to increase the key distribution speed.

The following describes an example of the quantum key distribution processing in the first embodiment.

Quantum Key Distribution Processing

Figure 2:
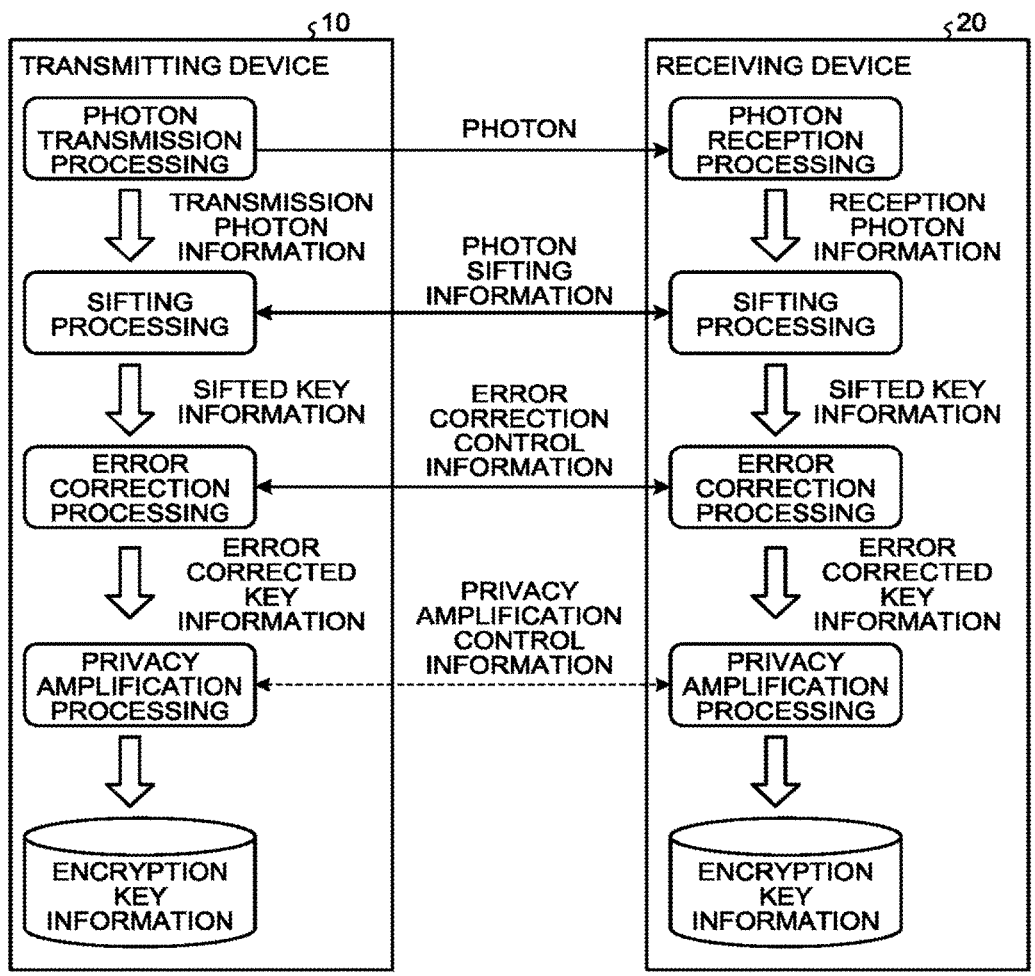
FIG. 2 is a schematic diagram illustrating an example of quantum key distribution processing in the first embodiment.

FIG. 2 is a schematic diagram illustrating an example of the quantum key distribution processing in the first embodiment. The quantum key distribution processing is composed of four processing steps including transmission and receiving of photons as a starting step. The first processing step is photon transmission-reception processing. The second processing step is sifting processing. The third processing step is error correction processing. The fourth processing step is privacy amplification processing. It is necessary for further increasing the key distribution speed to cause any of the four processing steps to be performed at a high speed.

The following describes a case where the quantum communication system 100 in the first embodiment performs the sifting processing at a high speed. First, each processing of the quantum key distribution processing is described.

Photon Transmission-Reception Processing

The transmitting device 10 transmits transmission photons to the receiving device via a quantum communication path capable of transmitting transmission photons (photon transmission processing). The receiving device receives, as reception photons, the transmission photons transmitted from the transmitting device (photon reception processing). The transmitting device 10 stores therein transmission photon information in which base information (a transmission base) when the transmitting device 10 transmits the transmission photon, bit information (a transmission bit), and timing information indicating timing at which the transmission photon is transmitted are in association with one another. The receiving device 20 stores therein reception photon information in which the base information (a reception base) when the receiving device 20 receives the reception photon, the bit information (a reception bit), and the timing information indicating timing at which the reception photon is received are in association with one another. The photon transmission-reception processing is described in more detail later.

Sifting Processing

The sifting processing in the transmitting device 10 uses the transmission photon information. The sifting processing in the receiving device 20 uses the reception photon information. First, photon sifting information is exchanged between the transmitting device 10 and the receiving device 20. The photon sifting information is used for associating the transmission photon transmitted by the transmitting device 10 with the reception photon received by the receiving device 20. The photon sifting information is the timing information, for example.

The transmitting device 10 selects, out of the transmission photon information, the transmission photon information including the transmission base that is one when the transmitting device 10 transmits the transmission photon and identical with the reception base when the receiving device 20 receives the reception photon corresponding to the transmission photon. The receiving device 20 selects, out of the reception photon information, the reception photon information including the reception base that is one when the receiving device 20 receives the reception photon corresponding to the transmission photon transmitted by the transmitting device 10 and identical with the transmission base when the transmitting device 10 transmits the transmission photon.

The transmitting device 10 produces sifted key data from a bit sequence composed of the transmission bits included in the selected transmission photon information. The receiving device 20 produces the sifted key data from a bit sequence composed of the reception bits included in the selected reception photon information.

The reception photon received by the receiving device 20 from the transmitting device 10 includes a noise in an optical fiber in the photon transmission-reception processing, a noise caused by a characteristic of a photon detector of the receiving device 20, and a trace of eavesdropping by an eavesdropper, for example. The sifted key data of the transmitting device 10 and the sifted key data of the receiving device 20 partially differ from each other (include errors) in some cases. The sifting processing is described in more detail later.

Error Correction Processing

The error correction processing uses the sifted key data after the sifting processing. The error correction processing aims to correct errors included in the sifted key data and produce the bit sequence identical in both the transmitting device 10 and the receiving device 20. The bit sequence produced by the error correction processing is called error corrected key information. In the error correction processing, error correction control information is exchanged between the transmitting device 10 and the receiving device 20.

Privacy Amplification Processing

The privacy amplification processing uses the error corrected key information after the error correction processing. The privacy amplification processing aims to eliminate an amount of information possibly leaked theoretically in the photon transmission-reception processing, the sifting processing, and the error correction processing on the basis of quantum cryptography theory. The privacy amplification processing makes it possible to produce, as encryption key information, the bit sequence that has no possibility of being sniffed and is identical in both the transmitting device 10 and the receiving device 20.

Specifically, in the privacy amplification processing, the error corrected key information is compressed by the amount of information possibly leaked. A degree of compression is determined by quantum cryptography theory on the basis of statistical data obtained in the processing until the privacy amplification processing. The privacy amplification processing may include processing to exchange privacy amplification control information between the transmitting device 10 and the receiving device 20.

The following describes the details of the photon transmission-reception processing. First, the details of the photon transmission processing are described.

Details of Photon Transmission Processing

As a generation source of the transmission photons (a single photon), a typical laser light source may be used by being attenuated. When the transmitting device 10 uses a typical laser light source and encodes the transmission base and the transmission bit, a plurality of transmission photons instead of a single photon is exactly transmitted in some cases. In order to avoid such a case and guarantee the safety of the quantum hey distribution, a method called a decoy method may be used. In the decoy method, an intensity of output laser is not consistently constant and bits are transmitted with the laser output intensify which is different from that in transmission of normal bits in accordance with a certain probability. When the transmitting device 10 (the receiving device 20) selects the transmission base (reception base), basically, two types of bases are each randomly selected with a probability of 50%. In order to distribute the encryption key more efficiently, the rate of the probability may be changeable and the transmission base (reception base) may be selected with a different rate.

The transmitting device 10 may transmit the transmission photons by pulse-driving the laser light source described above. The pulse-driving is performed at a high speed. For example, the driving speed is 1 GHz. The pulse-driving speed is not limited to 1 GHz. The pulse-driving speed may be higher or lower than 1 GHz. The transmitting device 10 encodes the transmission base and the transmission bit for each single transmission photon by associating them with a phase of light or a polarization direction of light.

The following describes the details of the photon reception processing.

Photon Reception Processing

The reception (detection) of the reception photon may be performed using a photon detection element called an avalanche photodiode (APD). The APD may be made from indium gallium arsenide, silicon, germanium, or gallium nitride, for example. The APD is driven in an operation mode called a Geiger mode. In the Geiger mode, a reverse voltage higher than a breakdown voltage of the APD is applied to generate a large pulse with respect to incidence of the reception photon by an avalanche effect, thereby detecting the reception photon. The detection operation of the reception photon is continuously performed by supplying a square wave or a sine wave voltage including a voltage larger then the breakdown voltage and a voltage smaller than the breakdown voltage. The driving is performed at a high speed. For example, the driving speed is 1 GHz. The driving speed may be higher or lower than 1 GHz. The receiving device 20 decodes the reception base and the reception bit from a single reception photon by making a correlation between them and a phase of light or a polarization direction of light.

When the APD is used for the photon detector of the receiving device 20, a phenomenon called an after pulse may occur after the APD detects the reception photon. The after pulse is a phenomenon in which electrons generated by the avalanche effect as a result of the detection of the reception photon are trapped by lattice defects in the APD, and the trapped electrons are released in a delayed fashion. When the after pulse occurs, a detection signal is generated at a timing different from the inherent photon detection timing, accurately, immediately after the detection of the inherent reception photon. As a result, the detection signal behaves as a detection noise of the reception photon. When the APD is driven at a high speed, the elimination of the noise caused by the after pulse is one of the major problems of the photon detector to be solved.

One of the ways to eliminate the after pulse is a way in which the photon detection signals generated in a constant time period after the detection of the inherent reception photon are ignored. This constant time period is called a dead time. The receiving device 20 does mat detect the reception photons during the dead time, or determines that the photon detection signals generated during the dead time are not the ones by detection of the inherent reception signals, and ignores them. A value of the dead time can be set by a designer or an operator using a characteristic value (after pulse probability) of the APD and parameters such as a speed of the operation to drive the APD. The receiving device 20 does not detect the reception photons during the dead time, thereby making it possible to eliminate or reduce the noise caused by the after pulse.

The following describes the details of the sifting processing.

Details of Sifting Processing

FIG. 3 is a schematic diagram illustrating an example of the sifting processing in the first embodiment. The sifting processing includes timing information sifting processing and base sifting processing.

The following describes the timing information sifting processing. The timing information sifting processing selects, out of the transmission photon information stored in the transmitting device 10, the transmission photon information about the transmission photon corresponding to the reception photon detected by the receiving device 20. When detecting the reception photon, the receiving device 20 stores therein the reception photon information.

The receiving device 20 transmits, to the transmitting device 10, the timing information including at least reception timing of the detected reception photon (timing information communication).

The transmitting device 10 receives the timing information. The transmitting device 10 refers to transmission timing of the transmission photon information stored therein on the basis of the received timing information, checks which transmission photon out of the transmission photons transmitted by the transmitting device 10 is detected by the photon detector of the receiving device 20 as the reception photon, and selects the transmission photon information about the transmission photon corresponding to the reception photon actually detected by the receiving device (timing information matching processing).

In order to achieve the processing described above, the timing information needs to be synchronized in both the transmitting device 10 and the receiving device 20. The transmission timing at the transmitting device 10 and the reception timing at the receiving device 20 are synchronized taking into consideration the transmission timing at which the transmitting device 10 transmits a photon and a photon transmission time between the transmitting device 10 and the receiving device 20. The photon transmission time is determined by a distance of the optical fiber, which transmits the transmission photons, from the transmitting device 10 and the speed of light.

Specifically, the transmission timing and the reception timing are represented by a counter value counted one by one. The transmission timing and the reception timing may be represented by a time stamp based on time information at the transmitting device 10 and the receiving device 20.

For example, when the transmission timing and the reception timing are each represented by the counter value, the receiving device 20 waits for a photon transmission time from when the transmitting device 10 starts counting of the counter value, and starts counting the counter value, thereby making it possible to synchronize the timing information.

When the transmission time of the transmission photon in the optical fiber varies, any of the transmitting device 10 and the receiving device 20 may include a function to adjust a deviation in the timing information. For example, a control unit 22, which is described later, may have the function to adjust the deviation in the timing information.

The timing information sifting processing is exemplarily described above. Any method other than the timing information sifting processing described above may be used for the timing information sifting processing.

The following describes the base sifting processing. The base sifting processing selects, out of the transmission photon information (detected photon information) selected by the timing information sifting processing, the transmission bit (reception bit) for which the reception base that is selected by the receiving device 20 and the transmission base selected by the transmitting device 10 are identical.

The following processing is an example of the base sifting processing. The receiving device 20 notifies the transmitting device 10 of the reception base of the detected reception photon as control information (reception base information communication).

The transmitting device 10 receives the reception base information. The transmitting device 10 further refers to the reception base and the transmission photon information stored therein, and selects the transmission bit of the transmission photon information having the transmission base identical with the reception base. The transmitting device 10 produces a sequence of the selected bit information as the sifted key data. The transmitting device 10 further transmits, to the receiving device 20, whether the reception base and the transmission base are identical with each other for each of the detected reception photons (base coincidence-non-coincidence information communication).

The receiving device 20 receives the base coincidence-non-coincidence information. The receiving device 20 further selects the bit information included in the reception photon information having the reception base identical with the transmission base on the basis of the base coincidence-non-coincidence information. The receiving device 20 produces a sequence of the selected reception bits as the sifted key data. The transmitting device 10 (the receiving device 20) can select the transmission bit (reception bit) of the transmission photon (reception photon) in which the transmission base and the reception base are identical by the base sifting processing.

In the sifting processing, three types of communication (the timing information communication, the reception base information communication, and the base coincidence-non-coincidence information communication) are performed. Those types of communication may be performed using the same optical fiber used for transmitting the transmission photons, for example, or another optical fiber different from that used for transmitting the transmission photons. The three types of information communication may be performed using respective different optical fibers from one another. The timing information communication in the timing information sifting processing and the reception base information communication in the base sifting processing are the information communication performed continuously in the same direction. The two types of communication, thus, may be performed together in one time.

The following describes a functional configuration to cause the quantum communication system 100 in the first embodiment to perform the shifting processing at a high speed.

Functional Configuration of Quantum Communication System

FIG. 4 is a schematic diagram illustrating an exemplary functional configuration of the quantum communication system 100 in the first embodiment. The quantum communication system 100 in the first embodiment includes the transmitting device 10 and the receiving device 20.

The following describes the functional configuration of the transmitting device 10 in the first embodiment.

Functional Configuration of Transmitting Device

The transmitting device 10 in the first embodiment includes a transmission unit 11, a storage unit 12, a cache unit 13, a setting unit 14, a reception unit 15, and a sifting processing unit 16.

The transmission unit 11 continuously transmits photons (a single photon) to the receiving device 20. The transmission unit 11 is achieved by a semiconductor laser, an attenuator, and a driving circuit, for example.

The storage unit 12 stores therein the transmission photon information. The storage unit 12 is achieved by a readable-writable storage device. The storage unit 12 may be a non-volatile storage device such as a magnetic disk, an optical disc, or a flash memory, for example. The storage unit 12 may be a volatile storage device such as a dynamic random access memory (RAM) or a static RAM, for example. Generally, an access speed of the storage device is faster in the order of the static RAM, the dynamic RAM, and the non-volatile storage device. As the access speed (a reading speed of data retained in a recording area and a writing speed of data in a storage area) is faster, an achievable storage area becomes smaller.

The storage unit 12 retains the transmission photon information until the reception of the reception timing and the reception base from the receiving device 20 in order to achieve the timing information sifting processing. A retention period depends on the distance between the transmitting device 10 and the receiving device 20. For example, when the distance between the transmitting device 10 and the receiving device 20 is 10 km, the retention period is 6.6 μsec. For another example, when the distance between the transmitting device 10 and the receiving device 20 is 100 km, the retention period is 660 μsec.

The storage unit 12 needs to include a storage area for retaining the transmission photon information during the retention period. The storage area of the storage unit 12 varies depending on the retention period, a photon generation speed, and a size of a signal per single photon. For example, when the distance between the transmitting device 10 and the receiving device 20 is 100 km, the photon generation speed is 1 GHz, and the size of the signal per photon is 32 bits, the minimum required size of the storage area of the storage unit 12 is 21 Mbits.

For stable quantum key distribution, it is preferable for the storage unit 12 to have, as the size of the storage area, an area larger than the minimum required size. With an increase in distance between the transmitting device 10 and the receiving device 20, in photon generation speed, and in signal size per single photon, the minimum required size of the storage area increases. Generally, as the size of the storage area increases, the access time (a reading time of data retained in the recording area and a writing time of data in the storage area) to the storage area becomes longer. The increase in access time to the storage area storing therein the transmission photon information results in a decrease in processing speed of the timing information sifting processing, and thus a decrease in total processing speed of the sifting processing.

When receiving the reception timing from the sifting processing unit 16, the cache unit 13 stores therein, as a cache, one or more pieces of transmission photon information that includes the transmission timing after the elapse of a no-use period of the transmission photon from the transmission timing at which the transmission photon is transmitted such that the transmission timing is identical with the reception timing at which the transmission photon is detected by the receiving device 20 as the reception photon.

FIG. 5 is a schematic diagram for explaining an example of the transmission photon information stored in the cache unit 13 in the first embodiment. The transmission base (0 or 1) indicates the type of the transmission base. In the example illustrated in FIG. 5, transmission timing 1 at which the transmission photon is transmitted corresponds to the reception timing of the reception photon received by the receiving device 20. In the example illustrated in FIG. 5, a period 201 is the no-use period. The four pieces of transmission photon information included in a period 202 are temporarily stored in the cache unit 13.

The no-use period is the dead time described above, for example. When the no-use period is the dead time, the reception photons corresponding to the transmission photons transmitted at the transmission timing included in the period 201 are not detected by the receiving device 20. Although the transmission photon information having the transmission timing included in the period 201 is cached in the cache unit 13, the cached transmission photon information is not hit.

Even if the cache unit 13 preliminarily reads the four pieces of transmission photon information having transmission timing 2 to transmission timing 5, the transmission photon information having transmission timing 2 to transmission timing 4 is unnecessary. In contrast, when the cache unit 13 preliminarily reads the four pieces of transmission photon information having transmission timing included in the period 202, all of the four pieces of transmission photon information are probably used for the next timing information sifting processing. The four pieces of transmission photon information are, thus, not unnecessary.

When the four pieces of transmission photon information having transmission timing 5 to transmission timing 8 are preliminarily read, more pieces of effective transmission photon information are read than the case where the four pieces of transmission photon information having transmission timing 2 to transmission timing 5 are preliminarily read, thereby demonstrating an effect by the preliminarily reading of the cache unit 13 with a higher probability.

The number of pieces of transmission photon information preliminarily read by the cache unit 13 may be any number as long as the total size of the transmission photon information to be preliminarily read is equal to or smaller than a recording capacity of the cache unit 13.

Referring back to FIG. 4, a storage capacity of the storage device achieving the cache unit 13 is smaller than that of the storage device achieving the storage unit 12. The access speed of the storage device achieving the cache unit 13 is faster than that of the storage device achieving the storage unit 12.

For example, when the storage unit 12 is achieved by a dynamic RAM, the cache unit 13 is achieved by a static RAM. The storage capacity of the cache unit 13 is smaller than that of the storage unit 12. The cache unit 13, thus, cannot retain all of the transmission photon information stored in the storage unit 12. The cache unit 13, however, has access processing capability faster than that of the storage unit 12. As a result, when the cache unit 13 preliminarily reads, from the storage unit 12, the transmission photon information used by the sifting processing unit 16, the sifting processing unit 16 can perform the sifting processing at a higher speed than a case where the sifting processing unit 16 reads the transmission photon information stored in the storage unit 12.

In order to cause the effect of the cache unit 13 to be effectively functioned, it is necessary for the cache unit 13 to efficiently preliminarily read, from the storage unit 12, the transmission photon information having a high cache hit rate. The cache unit 13 preliminarily reads the transmission photon information by excluding unnecessary transmission photon information as much as possible because the storage capacity of the cache unit 13 is limited than that of the storage unit 12.

The setting unit 14 retains the no-use period of the transmission photon transmitted from the transmitting device 10. The no-use period is used when the cache unit 13 preliminarily reads the transmission photon information. The setting unit 14 sets the no-use period in the cache unit 13.

The setting unit 14 may retain the no-use period preliminarily determined by the designer or the operator of the quantum communication system 100, for example.

The setting unit 14 may select a value indicating the no-use period in accordance with an operation environment of the quantum communication system 100, for example. Examples of the operation environment of the quantum communication system 100 include a loss rate of the transmission photons (a single photon) in the optical fiber and detection efficiency of the reception photon by the receiving device 20.

The setting unit 14 may dynamically change a value of the dead time on the basis of a fluctuation in characteristics such as a detection rate and a detection error rate of the reception photon during the operation of the quantum communication system 100, for example.

The reception unit 15 receives, from the receiving device 20, the reception timing and the reception base of the reception photon detected by the receiving device 20. The communication path between the reception unit 15 of the transmitting device 10 and a transmission unit 25 of the receiving device 20 is the optical fiber. The communication path between the reception unit 15 of the transmitting device 10 and the transmission unit 25 of the receiving device 20 can be achieved by a conventional optical communication technology, for example.

The communication path between the reception unit 15 of the transmitting device 10 and the transmission unit 25 of the receiving device 20 may use the same optical fiber used for transmitting the transmission photons or another optical fiber different from the optical fiber used for transmitting the transmission photons.

The reception unit 15 inputs the reception timing and the reception base to the sifting processing unit 16.

The sifting processing unit 16 receives the reception timing and the reception base from the reception unit 15. The sifting processing unit 16 makes a correlation between the transmission base and the reception base on the basis of the reception timing and the transmission timing of the transmission photon information stored in the cache unit 13 to perform the sifting processing on the transmission bit.

The following describes the functional configuration of the receiving device 20 in the first embodiment.

Functional Configuration of Receiving Device

The receiving device 20 in the first embodiment includes a reception unit 21, the control unit 22, a setting unit 23, a measurement unit 24, and the transmission unit 25.

The reception unit 21 detects the transmission photon transmitted from the transmitting device 10 as the reception photon. The reception unit 21 is achieved by driving an element such as an APD as the photon detector.

The control unit 22 performs control to suppress the operation to detect the reception photons or the notification operation of the detected reception photons from being performed during the dead time set by the setting unit 23 after the detection of the reception photon by the reception unit 21 so as to suppress the erroneous detection of the reception photon caused by the after pulse in the photon detector.

The reception unit 21 and the control unit 22 may be achieved by a single functional block.

The setting unit 23 retains the dead time setting for suppressing the erroneous detection of the reception photon caused by the after pulse. The setting unit 23 sets the dead time in the control unit 22.

The setting unit 23 may retain the dead time preliminarily determined by the designer or the operator of the quantum communication system 100, for example.

The setting unit 23 may select a value indicating the dead time in accordance with the operation environment of the quantum communication system 100, for example.

The setting unit 23 may dynamically change a value of the dead time on the basis of a fluctuation in characteristics such as a detection rate and a detection error rate of the reception photon during the operation of the quantum communication system 100, for example.

The measurement unit 24 measures the reception timing of the detected reception photon.

The transmission unit 25 transmits the reception timing and the reception base to the transmitting device 10.

The following describes the timing information that represents the transmission timing and the reception timing. The timing information is used for making a correlation between the transmission photon transmitted by the transmitting device 10 and the reception photon received by the receiving device 20. The timing information is, thus, not always represented by a time. The timing information is a sequence number (count value) having a finite bit length, for example. The transmission timing stored in the storage unit 12 by the transmission unit 11 of the transmitting device 10 may be a count value that is incremented by one in accordance with the transmission timing at which the transmission photon is transmitted, and all of the bits are reset to zero when all of bits become one.

For example, when the operation speed of the transmission unit 11 of the transmitting device 10 is 1 GHz, a transmission interval of the transmission photons is 1 nsec. In this case, a value incremented every 1 nsec is stored in the storage unit 12 as the transmission timing of the transmission photon information.

When the timing information is 32 bits in size, the timing information is looped in 4 sec. If a time interval from a transmission time corresponding to the transmission timing of the transmission photon to a time at which the identification of the transmission photon and the reception photon is completed after the completion of time stamp sifting processing is equal to or smaller than the time interval (4 sec or less when the operation speed of the transmission unit 11 is 1 GHz), the time stamp sifting processing can be achieved. The bit length of the timing information is determined by the transmission interval of the transmission photons and the time stamp sifting processing time.

The following describes an example of the timing information sifting processing in the first embodiment.

Case Where Transmission Photon Information is not Hit in Cache

Figure 6:
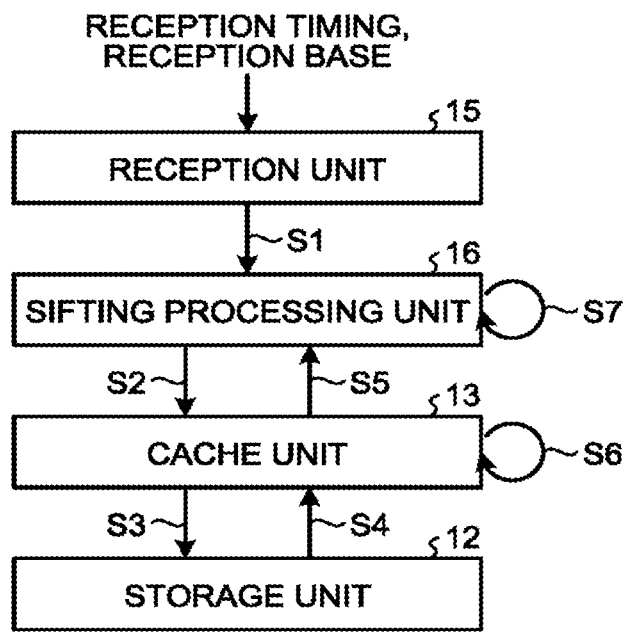
FIG. 6 is a schematic diagram illustrating an example 1 (a case where the transmission photon information is not hit in a cache) of timing information sifting processing in the first embodiment.

FIG. 6 is a schematic diagram illustrating an example 1 (a case where the transmission photon information is not hit in the cache) of the sifting processing in the first embodiment.

The reception unit 15 inputs the reception timing and the reception base to the sifting processing unit 16 (step S1). The sifting processing unit 16 inputs, to the cache unit 13, a request for reading the transmission photon information including the transmission timing corresponding to the reception timing (step S2).

The cache unit 13 inputs a request for reading a plurality of pieces of transmission photon information including the transmission photon information to the storage unit 12 because the cache unit 13 does not store the transmission photon information requested by the reading request (step S3). The multiple pieces of transmission photon information include the transmission photon information including the transmission timing corresponding to the reception timing, and one or more pieces of transmission photon information having no transmission timing information included in the no-use period described above after the transmission timing. The cache unit 13 sets the total size of the pieces of transmission photon information requested by the reading request to be equal to or smaller than the storage capacity of the cache unit 13.

The processing at step S3 is performed when the transmitting device 10 is started and the preliminarily reading by the cache unit 13 has failed, for example.

The cache unit 13 reads, from the storage unit 12, the pieces of transmission photon information serving as the targets of the reading request input to the storage unit 12 by the processing at step S3 (step S4). The cache unit 13 inputs, to the sifting processing unit 16, the transmission photon information that is not hit in the cache out of the pieces of transmission photon information read by the processing at step S4 (step S5). The cache unit 13 stores therein, as the cache, the transmission photon information that is not input to the sifting processing unit 16 by the processing at step S5 (step S6).

The sifting processing unit 16 performs the timing information sifting processing using the reception timing and the reception base that are received by the processing at step S1, and the transmission timing and the transmission base that are included in the transmission photon information received by the processing at step S5 (step S7).

In the case where the transmission photon information is no hit in the cache, the processing speed of the timing information sifting processing is equal to or smaller than that of the timing information sifting processing when the cache unit 13 is not included.

Case where Transmission Photon Information is Hit in Cache

Figure 7:
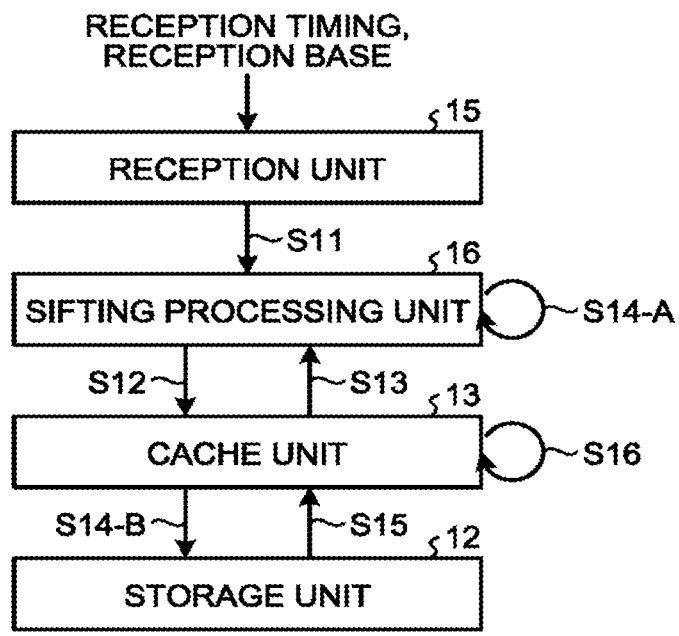
FIG. 7 is a schematic diagram illustrating an example 2 (a case where the transmission photon information is hit in the cache) of the timing information sifting processing in the first embodiment.

FIG. 7 is a schematic diagram illustrating an example 2 (a case where the transmission photon information is hit in the cache) of the timing information sifting processing in the first embodiment.

The reception unit 15 inputs the reception timing and the reception base to the sifting processing unit 16 (step S11). The sifting processing unit 16 inputs, to the cache unit 13, a request for reading the transmission photon information including the transmission timing corresponding to the reception timing (step S12).

The cache unit 13 inputs the transmission photon information requested by the reading request to the sifting processing unit 16 (step S13). The processing at step S13 makes it possible to input the transmission photon information to the sifting processing unit 16 at a higher speed than the conventional way.

The sifting processing unit 16 performs the timing information sifting processing using the reception timing and the reception base that are received by the processing at step S11, and the transmission timing and the transmission base that are included in the transmission photon information received by the processing at step S13 (step S14-A).

The cache unit 13 inputs, to the storage unit 12, a request for reading a plurality of pieces of transmission photon information having no transmission timing information included in the no-use period (step S14-B). The cache unit 13 sets the total size of the pieces of transmission photon information requested by the reading request to be equal to or smaller than the storage capacity of the cache unit 13.

The processing at step S14-A performed by the sifting processing unit 16 and the processing at step S14-B performed by the cache unit 13 are performed at the same timing.

The cache unit 13 reads, from the storage unit 12, the pieces of transmission photon information serving as the targets of the reading request input to the storage unit 12 by the processing at step S14-B (step S15). The cache unit 13 stores therein, as the cache, the pieces of transmission photon information read by the processing at step S15 (step S16).

As described above, the quantum communication system 100 in the first embodiment can perform the shifting processing at a higher speed.

Second Embodiment

The following describes a second embodiment. In the explanation of the second embodiment, the same explanation as the first embodiment is omitted and only a difference from the first embodiment is described. The explanation of the device configuration of the quantum communication system 100 in the second embodiment is omitted because the explanation of the quantum communication system 100 in the second embodiment has the same explanation of the quantum communication system 100 in the first embodiment.

Functional Configuration of Quantum Communication System

Figure 8:
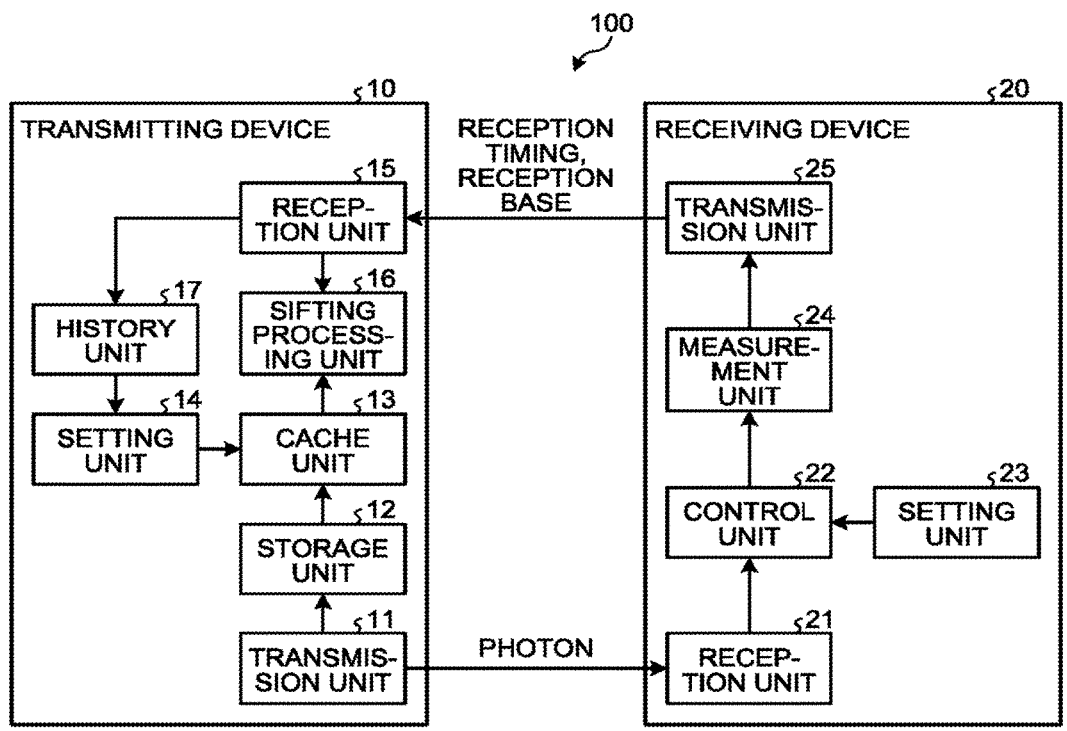
FIG. 8 is a schematic diagram illustrating an exemplary functional configuration of the quantum communication system in a second embodiment.

FIG. 8 is a schematic diagram illustrating an exemplary functional configuration of the quantum communication system 100 in the second embodiment. The quantum communication system 100 in the second embodiment includes the transmitting device 10 and the receiving device 20.

Functional Configuration of Transmitting Device

The transmitting device 10 in the second embodiment includes the transmission unit 11, the storage unit 12, the cache unit 13, the setting unit 14, the reception unit 15, the sifting processing unit 16, and a history unit 17. That is, the transmitting device 10 in the second embodiment includes the history unit 17 in addition to the functional configuration of the transmitting device 10 in the first embodiment.

The reception unit 15 stores the reception timing and the reception base received from the receiving device 20 in the history unit 17.

When receiving the reception timing and the reception base from the reception unit 15, the history unit 17 stores therein the reception timing and the reception base as a history.

The setting unit 14 reads, from the history unit 17, first reception timing at which a first reception photon is detected by the receiving device 20 and a second reception timing at which a second reception photon is detected after the first reception photon by the receiving device 20. The setting unit 14 sets, as the no-use period described above, a period representing an interval between the first reception timing and the second reception timing in the cache unit 13.

The setting unit 14 may set a period representing an interval between the first reception timing and the second reception timing as the no-use period and dynamically change the no-use period in accordance with the history, or continue to use a period representing an interval between the first reception timing calculated at specific timing and the second reception timing.

As described above, the quantum communication system 100 in the second embodiment can also obtain the same advantageous effects as the quantum communication system 100 in the first embodiment.

The function of the setting unit 14 in the first and the second embodiments and the function of the history unit 17 in the second embodiment may be achieved by the cache unit 13. The cache unit 13, the setting unit 14, and the history unit 17 may be achieved by a single functional block, for example.

The following describes an exemplary hardware configuration of the transmitting device 10 and the receiving device 20 in the first and the second embodiments.

Hardware Configuration of Transmitting Device and Receiving Device

Figure 9:
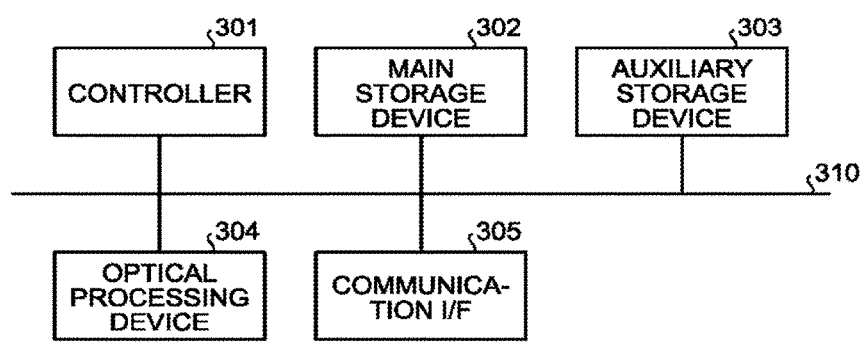
FIG. 9 is a schematic diagram illustrating an exemplary hardware configuration of a transmitting device and a receiving device in the first and the second embodiments.

FIG. 9 is a schematic diagram illustrating an exemplary hardware configuration of the transmitting device 10 and the receiving device 20 in the first and the second embodiments. The transmitting device 10 and the receiving device 20 in the first and the second embodiments each include a controller 301, a main storage device 302, an auxiliary storage device 303, an optical processing device 304, and a communication I/F 305. The controller 301, the main storage device 302, the auxiliary storage device 303, the optical processing device 304, and the communication I/F 305 are coupled to one another through a bus 310.

The controller 301 executes a program read in the main storage device 302 from the auxiliary storage device 303. The controller 301 is a central processing unit (CPU), for example. The main storage device 302 is a memory such as a read only memory (ROM) or a random access memory (RAM). The auxiliary storage device 303 is a memory card or a hard disk drive (HDD), for example.

The optical processing device 304 transmits or receives a single photon via the quantum communication path (optical fiber). The communication T/F 305 transmits or receives the communication information such as the control information via a classical communication path such as an optical fiber or the Ethernet (registered trademark).

The program executed by the transmitting device 10 and the receiving device 20 in the first and the second embodiments is recorded on a computer-readable recording medium such as a compact disc read only memory (CD-ROM), a memory card, a compact disc recordable (CD-R), or a digital versatile disc (DVD), in an installable or executable file format, and provided as a computer program product.

The program executed by the transmitting device 10 and the receiving device 20 in the first and the second embodiments may be stored in a computer connected to a network such as the Internet and provided by being downloaded via the network. The program executed by the transmitting device 10 and the receiving device 20 in the first and the second embodiments may be provided via a network such as the Internet without being downloaded.

The program executed by the transmitting device 10 and the receiving device 20 in the first and the second embodiments may be embedded and provided in a ROM, for example.

The program executed by the transmitting device 10 in the first and the second embodiments has a module configuration including functions achievable by the program out of the functional configurations of the transmitting device 10 in the first and the second embodiments. The program executed by the receiving device 20 in the first and the second embodiments has a module configuration including functions achievable by the program out of the functional configurations of the receiving device 20 in the first and the second embodiments.

The functions achieved by the program are loaded in the main storage device 302 as a result of the controller 301 reading out the program from the storage medium such as the auxiliary storage device 303 and executing the program. The functions achieved by the program are formed in the main storage device 302.

A part or all of the functions of the transmitting device 10 and the receiving device 20 in the first and the second embodiments may be achieved by hardware such as an integrated circuit (IC).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmitting device comprising:
a transmission unit configured to transmit a transmission photon to a receiving device;
a storage unit configured to store therein transmission photon information in which transmission timing at which the transmission photon is transmitted, a transmission bit indicated by the transmission photon, and a transmission base of the transmission photon are in association with one another;
a cache unit configured to store, as a cache, one or more pieces of the transmission photon information including the transmission timing after an elapse of a no-use period of the transmission photon from the transmission timing at which the transmission photon corresponding to a reception photon detected at reception timing by the receiving device is transmitted by the transmission unit;
a reception unit configured to receive, from the receiving device, the reception timing and a reception base of the reception photon; and
a sifting processing unit configured to perform sifting processing on the transmission bit by making a correlation between the transmission base and the reception base on the basis of the reception timing and the transmission timing of the transmission photon information stored in the cache unit.

2. The transmitting device according to claim 1, wherein an access speed of the cache unit is faster than an access speed of the storage unit.

3. The transmitting device according to claim 1, wherein the no-use period is a dead time in which a photon detector used for the receiving device is incapable of detecting a photon.

4. The transmitting device according to claim 1, wherein the no-use period is a period indicating an interval between first reception timing at which a first reception photon is detected by the receiving device and second reception timing at which a second reception photon is detected by the receiving device after the detection of the first reception photon.

5. The transmitting device according to claim 1, further comprising a setting unit configured to dynamically change the no-use period in accordance with a history of a period indicating an interval between first reception timing at which a first reception photon is detected by the receiving device and second reception timing at which a second reception photon is detected by the receiving device after the detection of the first reception photon.

6. A quantum communication system comprising:
a transmitting device; and
a receiving device,
the transmitting device comprising:
a transmission unit configured to transmit a transmission photon to a receiving device;
a storage unit configured to store therein transmission photon information in which transmission timing at which the transmission photon is transmitted, a transmission bit indicated by the transmission photon, and a transmission base of the transmission photon are in association with one another;
a cache unit configured to store, as a cache, one or more pieces of the transmission photon information including the transmission timing after an elapse of a no-use period of the transmission photon from the transmission timing at which the transmission photon corresponding to a reception photon detected at reception timing by the receiving device is transmitted by the transmission unit;
a reception unit configured to receive, from the receiving device, the reception timing and a reception base of the reception photon; and
a sifting processing unit configured to perform sifting processing on the transmission bit by making a correlation between the transmission base and the reception base on the basis of the reception timing and the transmission timing of the transmission photon information stored in the cache unit.

7. A quantum communication method comprising:
transmitting a transmission photon to a receiving device;
storing transmission photon information in which transmission timing at which the transmission photon is transmitted, a transmission bit indicated by the transmission photon, and a transmission base of the transmission photon are in association with one another;
storing, as a cache, one or more pieces of the transmission photon information including the transmission timing after an elapse of a no-use period of the transmission photon from the transmission timing at which the transmission photon corresponding to a reception photon detected at reception timing by the receiving device as a is transmitted by a transmission unit;
receiving, from the receiving device, the reception timing and a reception base of the reception photon; and
performing sifting processing on the transmission bit by making a correlation between the transmission base and the reception base on the basis of the reception timing and the transmission timing of the transmission photon information stored in the cache unit.

* * * * *